(12) United States Patent
Wang

(10) Patent No.: US 11,409,168 B2
(45) Date of Patent: Aug. 9, 2022

(54) ARRAY SUBSTRATE, DISPLAY PANEL AND DISPLAY DEVICE

(71) Applicant: BOE TECHNOLOGY GROUP CO., LTD., Beijing (CN)

(72) Inventor: Haiyan Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 791 days.

(21) Appl. No.: 16/068,636

(22) PCT Filed: Jan. 2, 2018

(86) PCT No.: PCT/CN2018/070026
§ 371 (c)(1),
(2) Date: Jul. 6, 2018

(87) PCT Pub. No.: WO2018/205647
PCT Pub. Date: Nov. 15, 2018

(65) Prior Publication Data
US 2021/0165289 A1  Jun. 3, 2021

(30) Foreign Application Priority Data

May 12, 2017 (CN) .......................... 201710335667.0

(51) Int. Cl.
*G02F 1/1343* (2006.01)
*G02F 1/1333* (2006.01)
*G02F 1/1335* (2006.01)
*G02F 1/1362* (2006.01)

(52) U.S. Cl.
CPC .. *G02F 1/134336* (2013.01); *G02F 1/133345* (2013.01); *G02F 1/133514* (2013.01); *G02F 1/136286* (2013.01)

(58) Field of Classification Search
CPC ......... G02F 1/134336; G02F 1/133345; G02F 1/133514; G02F 1/136286; G02F 1/1368;
(Continued)

(56) References Cited

U.S. PATENT DOCUMENTS 5,883,687 A * 3/1999 Lu .......................... G02F 1/1396
349/201
6,226,057 B1 * 5/2001 Lee ................... G02F 1/134336
349/38
(Continued)

FOREIGN PATENT DOCUMENTS

| CN | 102629041 A | 8/2012 |
|---|---|---|
| CN | 202443185 U | 9/2012 |

(Continued)

OTHER PUBLICATIONS

Search Report and Written Opinion for International Application No. PCT/CN2018/070026 dated Mar. 29, 2018.

*Primary Examiner* — Hoan C Nguyen
(74) *Attorney, Agent, or Firm* — Calfee, Halter & Griswold LLP

(57) ABSTRACT

An array substrate, a display panel, and a display device. The array substrate includes a plurality of pixel units arranged in a matrix, wherein each row of pixel units includes a plurality of first pixel units and a plurality of second pixel units arranged at intervals. Furthermore, the array substrate further includes: a first pixel electrode layer, a second pixel electrode layer, and a transparent insulating layer between the first pixel electrode layer and the second pixel electrode layer. In the above array substrate, for each row of pixel units, a plurality of first pixel electrodes for the plurality of first pixel units are arranged at intervals in the first pixel electrode layer, and a plurality of second pixel electrodes for (Continued)

the plurality of second pixel units are arranged at intervals in the second pixel electrode layer.

11 Claims, 3 Drawing Sheets

(58) Field of Classification Search
CPC ......... G02F 1/136227; G02F 1/134309; G02F 2201/123; G02F 1/136213; G09G 3/3659; G09G 3/3648; G09G 2310/02; G09G 2300/0809; G09G 2300/0426; H01L 27/1214
See application file for complete search history.

(56) References Cited

U.S. PATENT DOCUMENTS

| | | | | |
|---|---|---|---|---|
| 6,559,913 | B1* | 5/2003 | Sera | G02F 1/136286 349/111 |
| 6,919,932 | B2* | 7/2005 | Ahn | G02F 1/1362 349/42 |
| 2002/0142505 | A1* | 10/2002 | Hwang | H01L 27/1288 438/30 |
| 2010/0079381 | A1* | 4/2010 | Hayashi | G02F 1/13338 345/172 |
| 2011/0149224 | A1* | 6/2011 | Tseng | G02F 1/134309 349/142 |
| 2015/0301387 | A1* | 10/2015 | Tamaki | G02F 1/133555 349/37 |
| 2016/0079315 | A1* | 3/2016 | Oh | H01L 27/3211 257/40 |

FOREIGN PATENT DOCUMENTS

| | | |
|---|---|---|
| CN | 104062814 A | 9/2014 |
| CN | 105093685 A | 11/2015 |
| CN | 105824158 A | 8/2016 |
| CN | 106526942 A | 3/2017 |
| CN | 107037641 A | 8/2017 |

* cited by examiner

ARRAY SUBSTRATE, DISPLAY PANEL AND DISPLAY DEVICE

The present application is the U.S. national phase entry of PCT/CN2018/070026 filed on Jan. 2, 2018, which claims the priority of Chinese patent application No. 201710335667.0 filed on May 12, 2017, the entire disclosures of which are incorporated herein by reference.

TECHNICAL FIELD

The present disclosure relates to the field of display technologies, and in particular to an array substrate, a display panel comprising the array substrate, and a display device comprising the display panel.

BACKGROUND ART

In order to obtain a more real display effect, it is desirable that a liquid crystal display panel has a high PPI (pixel per inch). However, at present, a TN (Twisted Nematic) type of liquid crystal display panel with a high PPI is prone to light leakage in dark states, and an ADS (Advanced Super Dimension Switch) type of liquid crystal panel with a high PPI is prone to color mixing.

Therefore, how to provide a liquid crystal display panel without light leakage in dark states and also without color mixing has become an urgent technical problem to be solved in the art.

SUMMARY

It is an objective of the present disclosure to provide an array substrate, a display panel comprising the array substrate, and a display device comprising the display panel, so as to solve or at least alleviate one or more of the above technical problems.

In order to achieve the above objective, an array substrate is provided according to an aspect of the present disclosure. The array substrate comprises a plurality of pixel units arranged in a matrix, wherein each row of pixel units comprises a plurality of first pixel units and a plurality of second pixel units arranged at intervals. Furthermore, the array substrate further comprises a first pixel electrode layer, a second pixel electrode layer, as well as a transparent insulating layer between the first pixel electrode layer and the second pixel electrode layer. Besides, for each row of pixel units in the array substrate, a plurality of first pixel electrodes for the plurality of first pixel units are arranged at intervals in the first pixel electrode layer, and a plurality of second pixel electrodes for the plurality of second pixel units are arranged at intervals in the second pixel electrode layer. Besides, an orthogonal projection of each second pixel electrode on the first pixel electrode layer is located between two adjacent first pixel electrodes. It should be pointed out that in depicting the present disclosure, the expression of "orthogonal projection" refers to a projection in a direction perpendicular to an extension face of the first pixel electrode layer for example.

In certain exemplary embodiments of the above described array substrate, for each row of pixel units, a spacing between the orthogonal projection of each second pixel electrode on the first pixel electrode layer and an adjacent first pixel electrode falls in a range of 0.1 µm to 0.8 µm, wherein the spacing refers to a spacing within the extension face of the first pixel electrode layer.

In certain exemplary embodiments of the above described array substrate, the transparent insulating layer is made of at least one of silicon oxides and silicon nitrides.

In certain exemplary embodiments, the array substrate further comprises a plurality of data lines, wherein an orthogonal projection of each data line on the first pixel electrode layer is sandwiched between an orthogonal projection of a second pixel electrode on the first pixel electrode layer and a first pixel electrode.

In certain exemplary embodiments of the above described array substrate, the data lines have a width of 0.8 µm to 1.5 µm.

According to another embodiment of the present disclosure, a display panel is provided. The display panel comprises the array substrate as mentioned in any of the above embodiments.

In certain exemplary embodiments, the display panel further comprises a counter substrate and a color film layer arranged on the counter substrate. Furthermore, the color film layer comprises a plurality of filter units corresponding to the plurality of pixel units respectively, wherein each filter unit comprises a plurality of color filter blocks with mutually different colors.

In certain exemplary embodiments of the above described display panel, the counter substrate is further provided with a plurality of common electrodes.

According to yet another embodiment of the present disclosure, a display device is provided, the display device comprising the display panel as mentioned in any of the above embodiments.

BRIEF DESCRIPTION OF DRAWINGS

The drawings are used to provide further understanding of the present disclosure and constitute part of the description of the present disclosure. The drawings explain the present disclosure together with the specific embodiments below, but do not limit the present disclosure in any sense. In the drawings.

DETAILED DESCRIPTION OF EMBODIMENTS

Specific embodiments of the present disclosure will be described in detail with reference to the drawings. It should be understood that the specific embodiments described here are only used for illustrating and explaining the present disclosure, instead of limiting it.

Figure 1:
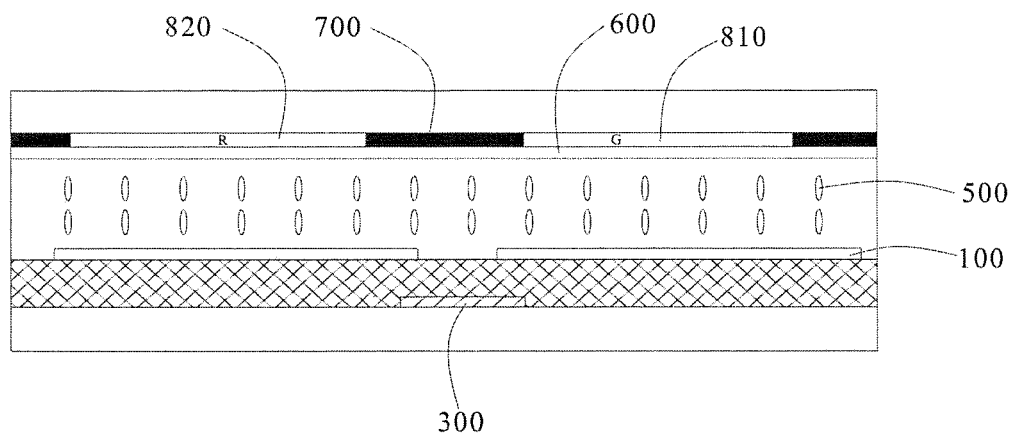
FIG. 1 is a schematic view of a typical twisted nematic type of array substrate.
Figure 2:
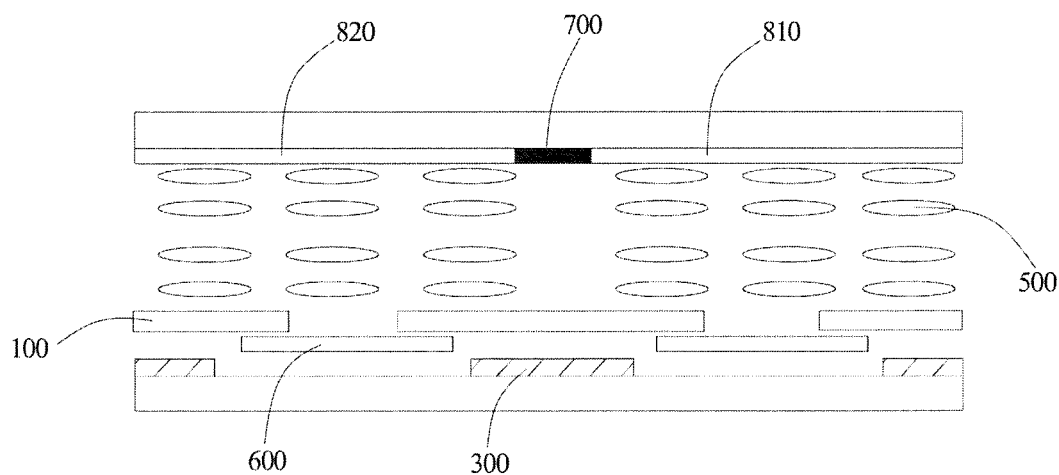
FIG. 2 is a schematic view of a typical advanced super dimension switch type of array substrate.

A liquid crystal display panel usually may be of two types: a TN (Twisted Nematic) type of liquid crystal display panel and an ADS (Advanced Super Dimension Switch) type of liquid crystal panel. Referring to FIG. 1, in a typical TN type of liquid crystal display panel, pixel electrodes 100 and data lines 300 are arranged on an array substrate; common electrodes 600, black matrices 700 and filter blocks (a red filter block 820 and a green filter block 810 as shown in FIG. 1) are arranged on a color film substrate; and a liquid crystal layer 500 is encapsulated between the array substrate and a counter substrate. In contrast, referring to FIG. 2, in a typical ADS type of liquid crystal display panel, common electrodes 600 and pixel electrodes 100 are arranged on an array substrate; black matrices 700 and filter blocks are arranged on a counter substrate; and a liquid crystal layer 500 is encapsulated between the array substrate and the counter substrate. As mentioned above in the background art, for a TN type of liquid crystal display panel, a high PPI can easily cause light leakage in dark states; while for an ADS type of liquid crystal panel, a high PPI can easily cause color mixing.

Figure 3:
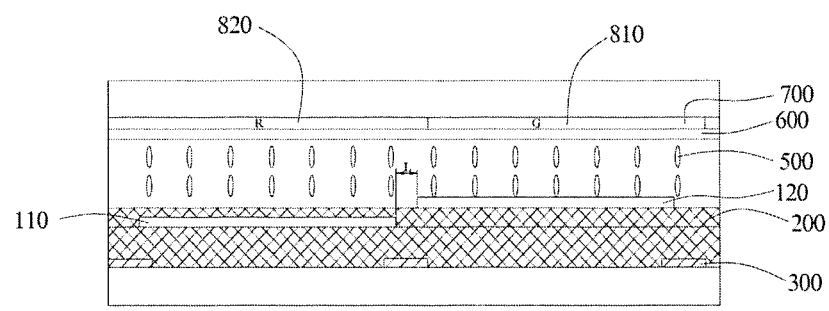
FIG. 3 is a schematic view of a display panel according to an embodiment of the present disclosure.
Figure 4:
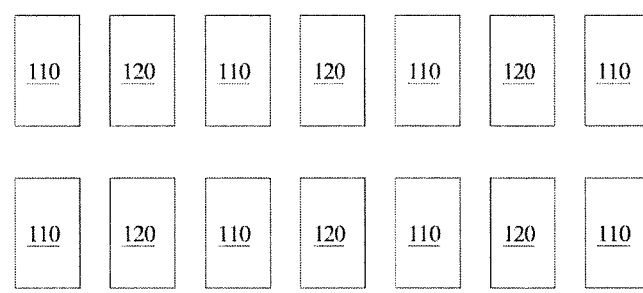
FIG. 4 is a plan view for the distribution of first pixel electrodes and second pixel electrodes in the display panel according to an embodiment of the present disclosure.

In an embodiment of the present disclosure, an array substrate is provided. The array substrate comprises a plurality of pixel units arranged in the form of a matrix. Specifically, in the matrix of pixel units, each row of pixel units comprises a plurality of first pixel units and a plurality of second pixel units arranged at intervals. In other words, the pixel units of the entire array substrate are divided into two types: first pixel units and second pixel units, and in each row, the two types of pixel units are arranged alternatingly. As shown in FIG. 3, the array substrate further comprises a first pixel electrode layer, a second pixel electrode layer, as well as a transparent insulating layer 200 between the two pixel electrode layers. As shown in FIG. 4, in each row of pixel units, a plurality of first pixel electrodes 110 for the plurality of first pixel units are arranged at intervals in the first pixel electrode layer, and a plurality of second pixel electrodes 120 for the plurality of second pixel units are arranged at intervals in the second pixel electrode layer. Besides, in each row of pixel units, an orthogonal projection of each second pixel electrode 120 on the first pixel electrode layer is located between two adjacent first pixel electrodes 110.

The array substrate according to embodiments of the present disclosure can be applied to a display device where back light is needed (for example, a liquid crystal display device). Specifically, in an embodiment as shown in FIG. 3, the first pixel electrode layer is arranged below the second pixel unit layer. In this case, in the first pixel electrode layer, because the first pixel electrodes 110 have large spacings, precision requirements of a mask plate for forming the first pixel electrodes 110 through a patterning process are reduced. This helps to obtain the first pixel electrodes 110 with both a precise dimension and a precise location. Likewise, in the second pixel electrode layer, since the second pixel electrodes 120 have large spacings, precision requirements of a mask plate for forming the second pixel electrodes 120 through a patterning process are also reduced. Again, this helps to obtain the second pixel electrodes 120 with both a precise dimension and a precise location. Therefore, in the array substrate as provided by embodiments of the present disclosure, more pixel units can be arranged, which helps to achieve a display device having a high resolution (i.e., a high PPI).

Besides, in the array substrate as provided by embodiments of the present disclosure, since there is a gap between the two pixel electrode layers in a thickness direction of the array substrate, light emitted from a backlight source can form an emission angle when passing through the first pixel electrode layer below. Therefore, color mixing can be prevented if a display device comprising the array substrate is in display.

As mentioned above, since the pixels can form an emission angle when emitting light, and the spacing between two adjacent pixel electrodes is small, no black matrix is required in the display panel according to embodiments of the present disclosure, which further reduces the cost of the display panel.

In an embodiment of the present disclosure, the spacing between the first pixel electrode and the second pixel electrode can be selected flexibly upon actual needs. For example, in certain exemplary embodiments, in each row of pixel units, a lateral spacing L between the orthogonal projection of each second pixel electrode 120 on the first pixel electrode layer and an adjacent first pixel electrode 110 falls in a range of 0.1 μm to 0.8 μm, thereby reducing the precision requirements for the mask plate while still ensuring a high PPI. The lateral spacing refers to a spacing in an extension face of the first pixel electrode layer. Moreover, when the lateral spacing falls in a range of 0.1 μm to 0.8 μm, light leakage in dark states can be avoided to the maximum extent. Further in certain exemplary embodiments, the lateral spacing L can be controlled within 0.5 μm.

In an embodiment of the present disclosure, the material for forming the transparent insulating layer 200 can be selected flexibly upon actual needs, as long as the first pixel electrode layer and the second pixel electrode layer can be spaced from each other in an insulating manner. For example, as an in certain exemplary embodiments, the transparent insulating layer 200 can be formed by using a material for forming a passivation layer in the array substrate. In other words, the transparent insulating layer 200 can be formed by using silicon oxides and/or silicon nitrides.

Those skilled in the art can easily understand that, in order to facilitate the provision of gray scale signals to the first pixel electrodes 110 and the second pixel electrodes, the array substrate further comprises a plurality of data lines 300. Further, in certain exemplary embodiments, in order to increase the aperture ratio, an orthogonal projection of each data line 300 on the first pixel electrode layer is sandwiched between an orthogonal projection of a second pixel electrode 120 on the first pixel electrode layer and a first pixel electrode 110. The advantage of disposing data lines within the horizontal spacing L between the first pixel electrodes 110 and the second pixel electrodes 120 lies in that a black matrix can be used to occlude them. It can be easily understood that the data lines 300 extend in a same direction as a column direction of the pixel units.

In an embodiment of the present disclosure, a width of the data lines can be arranged flexibly upon actual needs. For example, in certain exemplary embodiments, the data lines 300 can have a width of 0.8 μm to 15 μm.

According to another aspect of the present disclosure, a display panel is provided. The display panel comprises the array substrate as described in detail in any of the above embodiments.

In an embodiment of the present disclosure, the display panel can specifically be any suitable type. For example, the display panel can be either a liquid crystal display panel or other display panels where a backlight source is needed.

As mentioned above, with the array substrate as provided in embodiments of the present disclosure, the display panel can also prevent light leakage in dark states and suppress color mixing while still achieving a high PPI.

In a specific embodiment as shown in FIG. 3, the display panel is a liquid crystal display panel. I.e., the display panel further comprises a liquid crystal layer 500.

As shown in FIG. 3, the display panel is a liquid crystal display panel, wherein a liquid crystal layer 500 is encapsulated between a counter substrate and an array substrate.

In order to achieve color display, in certain exemplary embodiments, a color film layer can be arranged on the counter substrate. As shown in FIG. 3, the color film layer can comprise a plurality of filter units corresponding to the plurality of pixel units respectively, wherein each filter unit comprises a plurality of color filter blocks with mutually different colors.

For example, in a specific embodiment as shown in FIG. 3, a red filter block 820 corresponds to a first pixel unit where the first pixel electrode 110 is located, and a green filter block 810 corresponds to a second pixel unit where the second pixel electrode 120 is located.

The array substrate according to embodiments of the present disclosure can be applied to either a TN type of display panel or an ADS type of display panel. In an embodiment as shown in FIG. 3, the array substrate is applied to a TN type of display panel. In a TN type of display panel, the common electrodes 600 are arranged on the counter substrate.

With the array substrate as provided in this application, a horizontal spacing between the pixel electrodes can be reduced to 0.5 µm, thereby obtaining a high PPI.

According to yet another aspect of the present disclosure, a display device is provided, comprising the display panel as described in any of the above embodiments. As mentioned above, the display device can achieve a high PPI without light leakage in dark states. Thus, such a display device has a good display effect.

In order to facilitate illustration, TechWiz 3D software is further used to simulate display in dark states of the display device comprising the display panel as shown in FIG. 3, and to simulate the display in dark states of the display device comprising the display panel as shown in FIG. 1.

Figure 6:
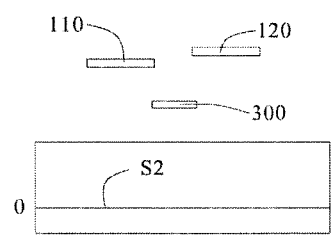
FIG. 6 is a light-emitting simulation diagram for a display device comprising the display panel as shown in FIG. 3.

In an embodiment of the present disclosure, the lateral spacing between the first pixel electrode 110 and the second pixel electrode 120 of the display device as shown in FIG. 3 is 0.5 µm, the width of the data lines 300 is 1.5 µm, and the width of the black matrices 700 is 2.5 µm. As can be known from the simulation result shown in FIG. 6, display luminance S2 is seldom subject to light leakage in dark states. Moreover, the aperture ratio of the display device can reach as high as 29%.

Figure 5:
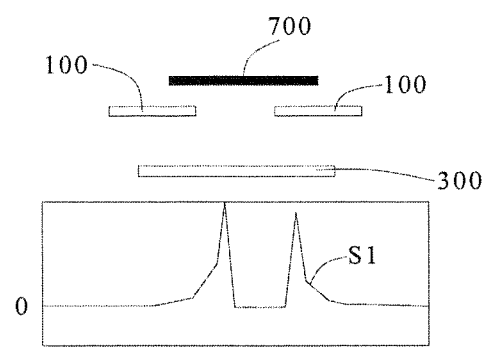
FIG. 5 is a light-emitting simulation diagram for the TN type of array substrate as shown in FIG. 1.

In contrast, TechWiz 3D software is further used to simulate the display in dark states of the display device as shown in FIG. 1. In FIG. 1, the spacing between the pixel electrodes 100 is 2.0 µm, the width of the data lines 300 is 6.4 µm, and the width of the black matrices is 4.3 µm. As can be seen in the simulation result shown in FIG. 5, display luminance S1 has a higher luminance value on the border of the pixel electrodes. This means that obvious light leakage occurs on the border of the pixel electrodes 100. In this embodiment, the aperture ratio of the display device is only 4.9%.

It can be understood that the above embodiments are only exemplary embodiments adopted for illustrating the principle of the present disclosure, but the present disclosure is not limited thereto. For a person having ordinary skills in the art, various variations and improvements can be made without deviating from the spirit and essence of the present disclosure, and these variations and improvements are also considered as falling within the protection scope of the present disclosure.

List of Reference Numerals
100 pixel electrode
110 first pixel electrode
120 second pixel electrode
200 transparent insulating layer
300 data line
500 liquid crystal layer
600 common electrode
700 black matrix
810 green filter block
820 red filter block

The invention claimed is:

1. An array substrate, comprising:
   a plurality of pixel units arranged in a matrix, wherein each row of pixel units in the matrix comprises a plurality of first pixel units and a plurality of second pixel units, each arranged at intervals;
   a plurality of a first pixel electrodes arranged at intervals;
   a plurality of a second pixel electrodes arranged at intervals in a different layer from the plurality of first pixel electrodes;
   a transparent insulating layer between and insulating the plurality of first pixel electrodes and the plurality of second pixel electrodes; and
   a plurality of data lines,
   wherein an orthogonal projection of each second pixel electrode on the transparent insulating layer is located between orthogonal projections of two adjacent first pixel electrodes on the transparent insulating layer, and
   wherein an orthogonal projection of each data line on the transparent insulating layer is sandwiched between an orthogonal projection of a second pixel electrode on the transparent insulating layer and an orthogonal projection of a first pixel electrode adjacent to the second pixel electrode on the transparent insulating layer, and a spacing between the orthogonal projection of the second pixel electrode on the transparent insulating layer and the orthogonal projection of the adjacent first pixel electrode on the transparent insulating layer is less than or equal to the width of the data line, the spacing refers to a spacing in an extension face of a layer where the plurality of first pixel electrodes are located, and the spacing falls in a range of 0.1 µm to 0.8 µm.

2. The array substrate according to claim 1, wherein the transparent insulating layer is made of at least one of silicon oxides and silicon nitrides.

3. The array substrate according to claim 1, wherein the data lines have a width of 0.8 µm to 1.5 µm.

4. A display panel comprising the array substrate according to claim 1.

5. The display panel according to claim 4, further comprising:
   a counter substrate; and
   a color filter layer arranged on the counter substrate, wherein the color filter layer comprises a plurality of filter units, each corresponding to a pixel unit of the plurality of pixel units respectively, and wherein each filter unit comprises a plurality of color filter blocks with mutually different colors.

6. The display panel according to claim 5, wherein the counter substrate comprises a plurality of common electrodes.

7. A display device comprising the display panel according to claim 4.

8. A display device comprising the display panel according to claim 5.

9. A display device comprising the display panel according to claim 6.

10. The display panel according to claim 4, wherein the transparent insulating layer is made of at least one of silicon oxides and silicon nitrides.

11. The display panel according to claim 4, wherein the data lines have a width of 0.8 μm to 1.5 μm.

* * * * *